(12) United States Patent
Zhang et al.

(10) Patent No.: US 10,455,678 B2
(45) Date of Patent: Oct. 22, 2019

(54) SYSTEMS AND METHODS FOR X-RAY IMAGING

(71) Applicant: SHANGHAI UNITED IMAGING HEALTHCARE CO., LTD., Shanghai (CN)

(72) Inventors: Xi Zhang, Shanghai (CN); Patrick Kling, Houston, TX (US); Yun Zou, Shanghai (CN); Alexander Zamyatin, Houston, TX (US)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 16 days.

(21) Appl. No.: 15/636,727

(22) Filed: Jun. 29, 2017

(65) Prior Publication Data

US 2018/0343728 A1    Nov. 29, 2018

Related U.S. Application Data

(63) Continuation of application No. PCT/CN2017/085530, filed on May 23, 2017.

(51) Int. Cl.
*H05G 1/00*   (2006.01)
*H05G 1/52*   (2006.01)
(Continued)

(52) U.S. Cl.
CPC ............ *H05G 1/52* (2013.01); *H01J 35/14* (2013.01); *H01J 35/305* (2013.01); *H04N 5/32* (2013.01);
(Continued)

(58) Field of Classification Search
CPC ....................................................... H01J 35/14
See application file for complete search history.

(56) References Cited

U.S. PATENT DOCUMENTS 4,803,716 A    2/1989   Ammann et al.
5,313,510 A *  5/1994   Ebersberger ........... A61B 6/032
                                                    378/12
(Continued)

FOREIGN PATENT DOCUMENTS

CN    104411081 A    3/2015
JP    S59217995 A    12/1984
(Continued)

OTHER PUBLICATIONS

International Search Report in International Application No, PCT/CN2017/085530 dated Feb. 23, 2018, 4 pages.
(Continued)

*Primary Examiner* — Dani Fox
(74) *Attorney, Agent, or Firm* — Metis IP LLC (57) ABSTRACT

A system and method for generating X-rays are disclosed. The method may include emitting an electron beam from a cathode to a focal track of a rotating target. The method may further include deflecting the electron beam onto a first region of the focal track at a first time, and deflecting the electron beam onto a second region of the focal track at a second time. The first region of the focal track may be separated from the second region of the focal track. The method may further include generating X-rays in response to the electron beam deflected onto the first region of the focal track or onto the second region of the focal track.

14 Claims, 9 Drawing Sheets

(51) Int. Cl.
  *H04N 5/32*   (2006.01)
  *H05G 1/38*   (2006.01)
  *H01J 35/14*  (2006.01)
  *H01J 35/30*  (2006.01)
  *H05G 1/04*   (2006.01)
  *H05G 1/70*   (2006.01)
  *H01J 35/10*  (2006.01)

(52) U.S. Cl.
  CPC .............. *H05G 1/38* (2013.01); *H01J 35/105* (2013.01); *H05G 1/04* (2013.01); *H05G 1/70* (2013.01)

(56) References Cited

U.S. PATENT DOCUMENTS

| | | | |
|---|---|---|---|
| 5,539,796 | A | 7/1996 | Takagi et al. |
| 6,181,771 | B1 | 1/2001 | Hell et al. |
| 7,496,180 | B1 | 2/2009 | Subraya et al. |
| 2004/0190682 | A1 | 9/2004 | Deuringer et al. |
| 2009/0022264 | A1 | 1/2009 | Zhou et al. |
| 2009/0060140 | A1* | 3/2009 | Subraya ............... H01J 35/14 378/125 |
| 2009/0238328 | A1 | 9/2009 | Forthmann et al. |
| 2010/0067651 | A1 | 3/2010 | Hsieh et al. |
| 2012/0128122 | A1 | 5/2012 | Kautz et al. |
| 2012/0275562 | A1 | 11/2012 | Kautz et al. |
| 2013/0223594 | A1 | 8/2013 | Sprong et al. |
| 2014/0105361 | A1 | 4/2014 | Vogtmeier et al. |
| 2015/0098548 | A1 | 4/2015 | Bathe et al. |
| 2016/0196950 | A1 | 7/2016 | Ishihara et al. |

FOREIGN PATENT DOCUMENTS

| | | |
|---|---|---|
| JP | 2008053061 A | 3/2008 |
| JP | 2009009794 A | 1/2009 |

OTHER PUBLICATIONS

Written Opinion in International Application No. PCT/CN2017/085530 dated Feb. 23, 2018, 4 pages.

First office action in Chinese application No. 201710517423.4 dated Oct. 31, 2018, 13 pages.

Rolf Behling, Histroy and Future of the X-Ray Tube: Can We Do It Better ? AAPM Spring Clinical Meeting, SLC, 2016.

* cited by examiner

SYSTEMS AND METHODS FOR X-RAY IMAGING

CROSS-REFERENCE TO RELATED APPLICATIONS

The present application is a continuation of International Application No. PCT/CN2017/085530, filed on May 23, 2017, the entire contents of which is hereby incorporated by reference.

TECHNICAL FIELD

The present disclosure relates to X-ray imaging, and more particularly, to a system and method for generating X-rays with two or more focal spots on a rotating anode in an X-ray generating tube.

BACKGROUND

A typical X-ray device includes an X-ray tube having a vacuum enclosure collectively formed by a cathode cylinder and an anode housing. A cathode is placed within the cathode cylinder. The cathode can include a filament that is connected to an electrical power source to generate electrons. An anode is placed in the anode housing spaced apart from the cathode. When the X-ray tube is energized, electrons are emitted from the cathode to a target portion of the anode (sometimes referred to as the "focal track"). A continuous presence of electrons at the same location on the focal track may produce a significant amount of heat, which may cause damages to the focal track.

SUMMARY

In accordance with some embodiments of the disclosed subject matter, an imaging device and methods for generating X-rays are provided.

In accordance with some embodiments of the disclosed subject matter, an imaging device is provided. The imaging device may include a cathode configured to generate an electron beam. The imaging device may also include an anode that includes a rotating target. The anode may be configured to generate X-rays in response to the electron beam impinging on a focal track relating to the rotating target. The imaging device may also include a deflection device. The deflection device may be configured to deflect the electron beam onto a first region of the focal track at a first time, and deflect the electron beam onto a second region of the focal track at a second time.

In some embodiments, the first region of the focal track may be separated from the second region of the focal track.

In some embodiments, the cathode may comprise a tungsten filament configured to produce the electron beam.

In some embodiments, the second region of the focal track may be deflected along a first direction from the first region of the focal track, wherein the first direction may be along a rotational axis of the rotating target.

In some embodiments, the first region may be deflected from the second region along the first direction by a first pitch shift.

In some embodiments, the first region may be deflected from the second region along the first direction by a first pitch shift.

In some embodiments, the focal track may be composed of tungsten-rhenium.

In some embodiments, the X-ray tube may include a vacuum enclosure between the anode and the cathode, and in the vacuum enclosure there may be a potential voltage to accelerate the electron beam.

In some embodiments, the deflection device may provide a magnetic field or an electric field configured to deflect the electron beam.

In some embodiments, the magnetic field may be generated by a quadrupole or a dipole.

In some embodiments, the X-ray tube may further include a cooling device configured to absorb heat generated by the anode.

Another aspect of the present disclosure relates to a method for generating X-rays. The method may include emitting an electron beam from a cathode to a focal track of a rotating target. The method may also include deflecting the electron beam onto a first region of the focal track at a first time, and deflecting the electron beam onto a second region of the focal track at a second time. The first region of the focal track may be separated from the second region of the focal track. The method may further include generating X-rays in response to the electron beam deflected onto the first region of the focal track or onto the second region of the focal track.

Another aspect of the present disclosure relates to a system for generating X-rays. The system may include a gantry having a scanning hole extending along a longitudinal direction. The system may also include an X-ray tube located on the gantry. The X-ray tube may include a cathode configured to generate an electron beam. The X-ray tube may also include an anode that includes a rotating target. The anode may be configured to generate X-rays in response to the electron beam impinging on a focal track relating to the rotating target. The X-ray tube may further include a deflection device that is configured to deflect the electron beam onto one or more regions of the focal track along the longitudinal direction.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 6-A and 6-B are schematics illustrating exemplary focal spots on a focal track according to some embodiments of the present disclosure;

FIGS. 8-A and 8-B illustrate deflections between two focal spots on a focal track according to some embodiments of the present disclosure;

FIG. 9-A illustrates a distribution of temperatures of a focal track according to FIG. 8-A; and FIG. 9-B illustrates a distribution of temperatures of a focal track according to FIG. 8-B.

BRIEF DESCRIPTION OF THE DRAWINGS

To address the deficiency that a continuous presence of electrons on a focal track may produce a significant amount of heat, implementations of the present disclosure provide for mechanisms (which can include methods, systems, computer-readable medium, etc.) for generating X-rays with two or more focal spots on a rotating anode in an X-ray generating tube. For example, the mechanisms can generate X-rays with two separate focal spots at different times when the electrons are impinging on the rotating anode.

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by other expression if they may achieve the same purpose.

It will be understood that when a unit, engine, module or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The present disclosure provided herein relates to generating X-rays with an electron beam impinging on a focal track of an anode. More particularly, the electron beam may be deflected to impinge on a first region and a second region of the focal track at different times.

Figure 1:
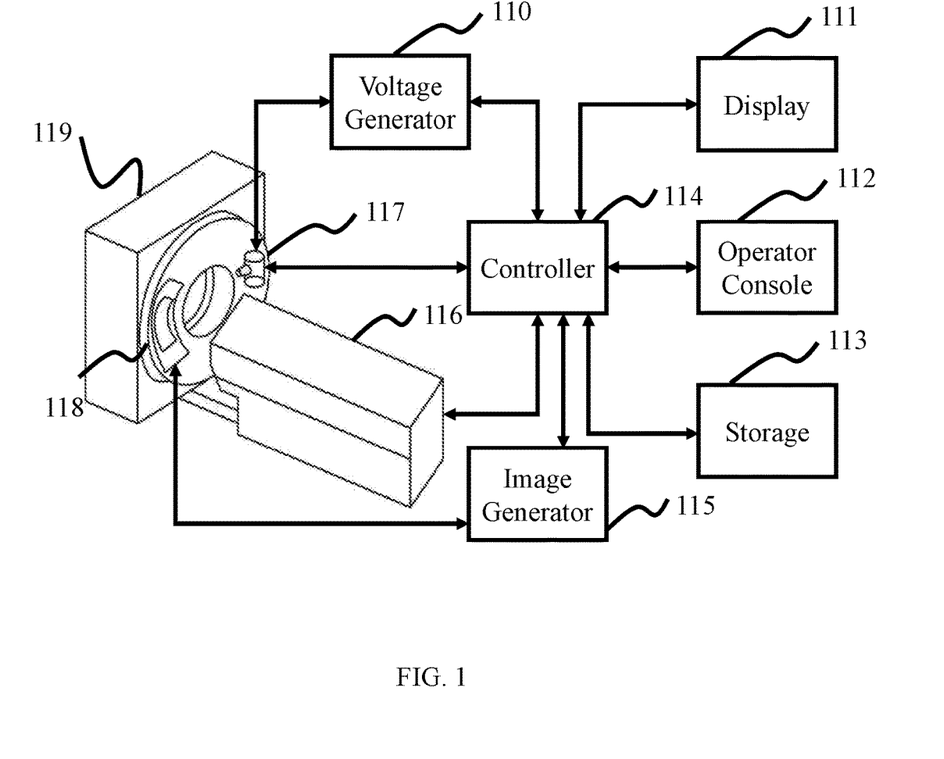
FIG. 1 is a block diagram of an X-ray imaging system according to some embodiments of the present disclosure.

FIG. 1 is a block diagram of an X-ray imaging system 100 according to some embodiments of the present disclosure. Merely by way of example, the X-ray imaging system 100 may be a computed tomography (CT) system, a digital radiography (DR) system, a multi-modality system, or the like, or any combination thereof. Here an X-ray imaging system 100 is typically described as an example of a radiation imaging system for better understanding. The X-ray imaging system 100 may find its applications in different fields such as, for example, medicine or industry. In some embodiments, the X-ray imaging system 100 may be used in, for example, internal inspection of components which may include e.g., flaw detection, security scanning, failure analysis, metrology, assembly analysis, void analysis, wall thickness analysis, or the like, or any combination thereof. In some embodiments, the X-ray imaging system 100 may be used in, for example, studying structure and morphology of crystals. In some embodiments, the X-ray imaging system 100 may be applicable in other non-invasive imaging contexts, such as baggage screening, package screening and/or industrial nondestructive evaluation of manufactured parts. It should be noted that the X-ray imaging system 100 described below is merely provided for illustrating an example of a radiation imaging system, and not intended to limit the scope of the present disclosure.

As shown in FIG. 1, the X-ray system 100 may include a gantry 119, an object table 116, a controller 114, an X-ray tube 117 located on the gantry 119, a detector 118 located on the gantry 119, a voltage generator 110, an image generator 115, an operator console 112, a display 111 and a storage 113, and/or any other modules for providing an X-ray system 100.

Figure 4:
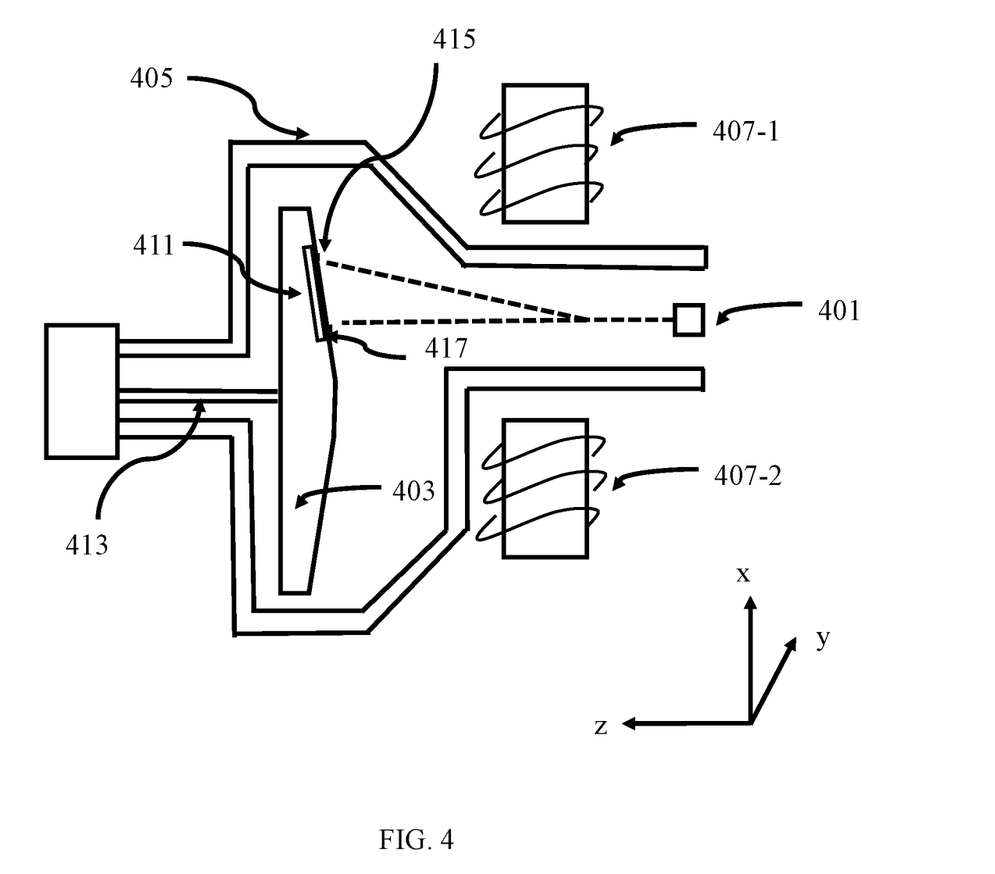
FIG. 4 illustrates a cross-sectional view of an exemplary X-ray tube according to some embodiments of the present disclosure.

The gantry 119 may include an aperture (also referred to "scanning hole") that is configured to accommodate an object (e.g., a patient) transported by the object table 116. The scanning hole may extend along a longitudinal direction (e.g., the z-direction as illustrated in FIG. 4). In some embodiments, the object may include a substance, a tissue, an organ, an object, a specimen, a body, or the like, or any combination thereof. The X-ray tube 117 may be configured to emit an X-ray beam to the object, whilst the detector 118 may be configured to receive X-rays (also referred to as projection data) that pass through the object. The X-ray tube 117 may include a cathode and an anode (not shown in FIG. 1). The X-ray beam emitted by the X-ray tube 117 may be in the shape of a line, a narrow pencil, a narrow fan, a fan, a cone, a wedge, an irregular shape, or the like, or any combination thereof. In some embodiments, the detector 118 may be configured to produce an analog electrical signal that represents the intensity of the received X-rays, including the attenuated beam, as it passes through the object. In some embodiments, the detector 118 may include a plurality of detector cells, each of the detector cells corresponding to a scintillator, a photoelectric component, etc. The pixels of the detector 118 may be represented by the number of the smallest detector cells, e.g., the number of detector cells. The detector cells of the detector 118 may be arranged in a single row, two rows, or another number of rows. The X-ray detector may be one-dimensional, two-dimensional, or three-dimensional.

The voltage generator 110 may be configured to produce high voltage, and apply it to the X-ray tube 117. The voltage generated by the voltage generator 110 may range from 80 kV to 140 kV, or from 120 kV to 140 kV. The current generated by the high voltage generator may range from 20 mA to 500 mA. In alternative embodiments of the present disclosure, the voltage generated by the high voltage generator 203 may range from 0 to 75 kV, or from 75 to 150 kV. The voltage generator 110 may provide voltage for the generation of X-rays. For examples, the voltage generator 110 may provide voltage that is used to accelerate the electron beam in the X-ray tube 117.

The controller 114 may be configured to control the operation of other components, such as the gantry 119, the tube 117, the voltage generator 110, the object table 116, the image generator 115, and/or the display 111. In some embodiments, the controller 114 may control the gantry 119 to rotate in a certain speed to an expected position by an operator. The controller 114 may also control the image generator 115 to process an image (e.g., an image generated by the image generator 115), and further control the storage 113 to store the processed image. In some embodiments, the image generator 115 may process the image by way of, for example, geometrical processing, arithmetic processing, image enhancement, image restoration, image reconstruction, image encoding, image understanding, etc. The controller 114 may enable the operator console 112 to adjust the scanning parameters during or after scanning the object. The controller 114 may control the display of images via the display 113. For instance, the whole or a part of an image may be displayed, or different sub-portions of an image may be displayed on a screen at the same time or in a certain order.

The operator console 112 may be configured to control the scanning process. An operator may access to the operator console 112 via an interface and adjust the scanning parameters, e.g., a scanning time, a voltage value applied to the X-ray tube 117, through various input methods. In some embodiments, the interface of the operator console 112 may include a mouse, a keyboard, a screen, an operating arm, a switch, an adjustment knob, a voice recognizer, a text recognizer, or the like, or a combination thereof. In some embodiments, the operator console 112 may be configured to send a command to other components in the X-ray imaging system 100, such as, the image generator 115, the controller 114, etc.

The display 111 may include one or more display devices that may present information to the operator. The information may include data relating to the object that is scanned. Exemplary display devices may include a liquid crystal display (LCD), a light emitting diode (LED)-based display, a flat panel display, a curved screen, a television device, a cathode ray tube (CRT), or the like, or a combination thereof. In some embodiments, one or more of the display devices may have a function of presenting three-dimensional scenes. One or more of the display devices may include touch screens.

The storage 113 may be capable of storing data, such as data provided by the controller 114, and/or any other components in the X-ray imaging system 100. Exemplary types of data that may be stored in the storage 113 may include images, operational parameters (e.g., voltage of the X-ray tube), and/or any other type of data that may be used in the X-ray imaging system 100 in accordance with various embodiments of the present disclosure. The storage 113 may include one or more components, including a hard disk driver, a magnetic tape, a removable storage drive (e.g., a phase change rewritable optical disk drive, a magneto-optical drive, a USB removable hard disk, etc.), a microdrive, or the like, or a combination thereof.

Figure 2:
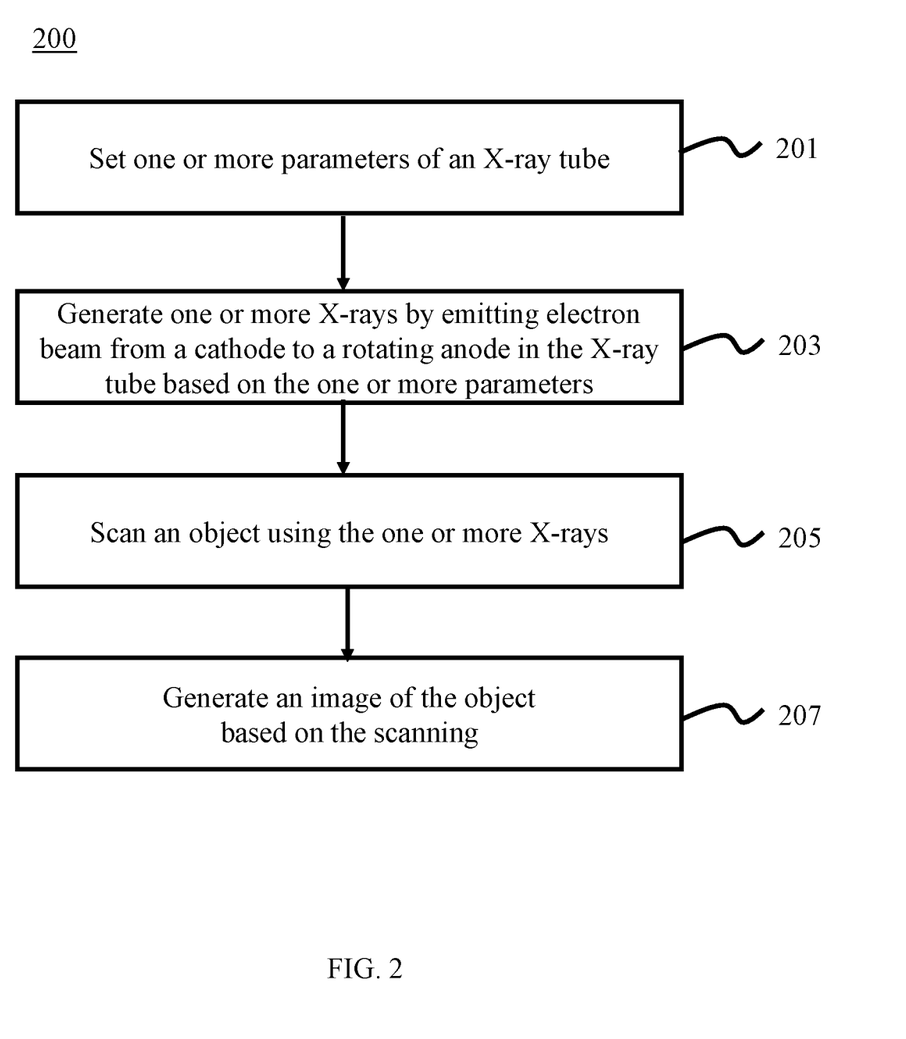
FIG. 2 is a flowchart illustrating an exemplary process for image acquisition according to some embodiments of the present disclosure.

FIG. 2 is a flowchart illustrating an exemplary process for image acquisition according to some embodiments of the present disclosure. In some embodiments, at least part of process 200 may be performed by or be implemented on one or more components of the X-ray imaging system 100 as shown in FIG. 1.

In 201, one or more parameters of an X-ray tube may be set. The parameters of the X-ray tube may include a voltage, a current, a rotating speed, a deflection field, a timing signal, or the like, or any combination thereof. A value of each of the parameters may be related to an object to be scanned. The values of a given parameter may or may not be the same for scanning of different objects. The parameters may be determined by controller 114 or be set by an operator via operator console 112.

In 203, one or more X-rays may be generated by emitting one or more electron beams from a cathode to a rotating anode in the X-ray tube based on the one or more parameters. The emitted electron beams may have any regular shape (e.g., a line, a narrow pencil, a narrow fan, a fan, a cone, a wedge, or the like) or any irregular shape.

In 205, an object may be scanned by the X-rays. Examples of the object may include a head, a breast, a lung, a pleura, a mediastinum, an abdomen, a long intestine, a small intestine, a bladder, a gallbladder, a triple warmer, a pelvic cavity, a backbone, extremities, a skeleton, a blood vessel, any other part of a patient, a piece of luggage, or the like, or any combination thereof. In some embodiments, the object may be transported by the object table 116 into the gantry 119 for scanning.

In 207, an image of the object may be generated based on the scanning. In some embodiments, one or more detectors may receive the X-rays during the scanning and generate data for X-ray image generation related to the object during and/or after the scanning. The one or more detectors may be configured to measure the flux, spatial distribution, spectrum, and/or other properties of X-rays. The one or more detectors may be a direct semiconductor detector, a gas-filled detector, a scintillation detector, or the like, or a combination thereof. The one or more detectors may have any shape (e.g., flat, arc-shaped, circular, etc.) The one or more X-ray detectors may have a fixed or an adjustable fan angle for detecting X-rays. Merely by way of example, a fan angle of an arc-shaped detector may be in a range of 0° to 360°. The fan angle may be fixed or adjustable according to different conditions including, for example, the desired resolution of an image, the size of an image, the sensitivity of a detector, the stability of a detector, or the like, or any combination thereof. The X-ray detectors may include, for example, one or more X-ray detectors of FIG. 1.

The data collected by the one or more detectors may then be processed to generate an image of the scanned object. The image may be a four-dimensional (4D) image, a three-dimensional (3D) image, a two-dimensional (2D) image, or the like, or a combination thereof. The data may be processed by performing one or more data processing operations, such as, data filtering, data classification, data normalization, data computation, etc. In some embodiments, the image may be generated using one or more image reconstruction techniques. Exemplary image reconstruction methods may include filtered back projection (FBP) reconstruction method, simultaneous iterative reconstruction technique (SIRT), matrix inversion tomosynthesis (MITS), iterative maximum a posteriori statistical reconstruction method, a Bayesian-based interactive reconstruction method, or the like, or a combination thereof. In some embodiments, the data processing and/or the image generation may be performed by the image generator 115.

Figure 3:
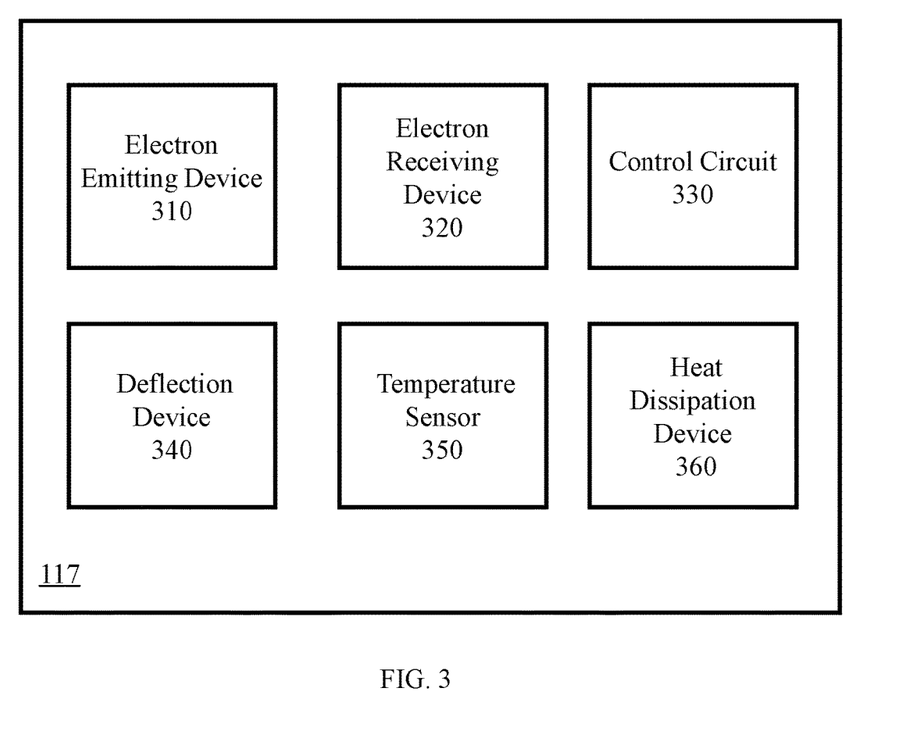
FIG. 3 is a block diagram of an X-ray tube according to some embodiments of the present disclosure.

FIG. 3 is a block diagram of an X-ray tube according to some embodiments of the present disclosure. The X-ray tube 117 may include an electron emitting device 310, an electron receiving device 320, a control circuit 330, a deflection device 340, a temperature sensor 350, a heat dissipation device 360, and/or any other device for X-ray imaging.

The electron emitting device 310 may be configured to emit an electron beam. The electron receiving device 320 may be configured to absorb, slows, and/or stop the electron beam. In some embodiments, the electron receiving device 320 may include a rotating target. The rotating target may have one or more surfaces. The electron beam can impinge on a surface of the rotating target at a particular angle. The electron beam may or may not impinge on different surfaces of the rotating target at the same angle. The impingement angle may have any suitable value (e.g., a value in the range of zero degree to 90 degrees). Each of the surfaces may have any regular shape (e.g., rectangle, square, triangle, etc.) or irregular shape. The rotating target of the electron receiving device 320 may be able to withstand a high temperature (e.g., 1000 degrees, 1200 degrees, 2500 degrees, or the like.). For example, the rotating target may be made of graphite.

In some embodiments, the electron beam can impinge on at least part of the one or more surfaces of the rotating target. As used herein, the spot or region which is formed by the impingement of the electron beam on the one or more surfaces may be referred to as a focal spot in this disclosure. The one or more surfaces may have one or more tracks. The one or more tracks, when impinged by the electron beam, may absorb, scatter, and/or stop the electron beam. The one or more tracks, which are capable of absorbing, scattering, and/or stopping the electron beam may be referred to as a focal track. When the electron beam impinges on the one or more surfaces of the rotating target, one or more radiation beams (e.g., an X-ray radiation, etc.) may be generated. The rotating target may rotate around an axis at a uniform speed (e.g., 800 revolutions per minute, etc.) or a varying speed. With the rotation of the rotating target, the focal spot where the electron beam impinges on the rotating target may change and form a target track.

The control circuit 330 may be configured to control operations of one or more components in the X-ray tube 117, such as, the electron-emitting device 310, the electron receiving device 320, the deflection device 340, the temperature sensor 350, the heat dissipation device 360, etc. For example, the control circuit 330 may send an instruction to the deflection device 340 to generate a magnetic field and/or an electric field. Additionally or alternatively, the control circuit 330 may set one or more parameters related to the magnetic field and/or electric field, such as a direction of the field or an intensity of the field. As another example, the control circuit 330 may control a voltage applied to the electron emitting device 310 and/or the electron receiving device 320.

The control circuit 330 may process data related to the X-ray tube 117. For example, the control circuit 330 may obtain temperature data from the temperature sensor 350 and determine whether the temperature is greater than a preset temperature threshold. Upon determining that the temperature is greater than a preset threshold, the control circuit 330 may send an instruction to the heat dissipation device 360 to reduce the temperature of the X-ray tube 117 the control circuit.

The deflection device 340 may be configured to deflect the electron beam generated by the electron emitting device 310. For example, the deflection device 340 may apply a magnetic field and/or an electric field to the electron beam. The magnetic field and/or the electric field may have any field direction or field intensity. In some embodiments, the magnetic field may be generated by a quadrupole or a dipole. The path direction of the electron beam may change due to the change of the magnetic field and/or the electric field. The corresponding focal spot where the electron beam impinges on the electron receiving device 320 may be defected accordingly.

In some embodiments, the voltage generator 110 may supply a voltage to the deflection device 340. The direction and/or the size of the voltage may have an impact on the magnetic field and/or the electric field generated by the deflection device 340. For example, the size of the supplied voltage may have an impact on the intensity of the magnetic field and/or the electric field. The voltage direction and/or the size of the voltage may be determined by one or more components of the X-ray imaging system 100 (e.g., the controller 114, etc.), or be set by an operator via the operator console 112.

The temperature sensor 350 may be configured to obtain or process temperature information related to the X-ray tube 117. The temperature information may include the temperatures of one or more components in the X-ray tube 117, such as, the electron emitting device 310, the rotating target of the electron receiving device 320, etc. Additionally or alternatively, the temperature information may include the temperatures of one or more focal spots in the focal track where the electron impinges on the rotating target. In order to prevent the X-ray tube 117 from overheating, the temperatures of one or more focal spots may not exceed the melting temperature of the material of the rotating target.

In some embodiments, when the temperature measured by the temperature sensor 350 exceed a preset value, it may send a signal to the control circuit 330. Once the control circuit 330 receives the signal, it may send an instruction to the heat dissipations device 360 to dissipate the heart of the X-ray tube 117. Additionally or alternatively, the control circuit 330 may instruct the operator console 112 to display an overheating warning.

The heat dissipation device 360 may be configured to dissipate heat to reduce the temperature of the X-ray tube 117. The heat dissipation device 360 may include a coolant, a cooling fin, or the like, and any combination thereof. The coolant may include water, ethylene glycol, chemical reagent, or the like. In some embodiments, the heat dissipation device 360 may include a cooling device that may absorb heat generated by the electron receiving device 320.

FIG. 4 illustrates a cross-sectional view of an exemplary X-ray tube according to some embodiments of the present disclosure. The X-ray tube may include a cathode 401, an anode 403, a housing 405, deflection electrodes 407-1 and 407-2, a rotary device 413, or any related other components.

The cathode 401 may emit one or more electron beams. The electron beams may pass through the space inside the housing 405 and move towards the anode 403. The anode 403 may rotate around a rotational axis (e.g., the z-axis as illustrated in FIG. 4). The rotation of the anode 403 may be driven by the rotary device 413. The x-direction illustrated in FIG. 4 may be a direction perpendicular to the z-direction. The electron beams may impinge on the surface of anode 403 at one or more focal spots. The one or more focal spots may locate on a focal track 411.

The deflection electrodes 407-1 and 407-2 may apply a magnetic field to the electron beam to deflect the electron beam. In some embodiments, the magnetic field may change over time (e.g., in a periodical manner). The electron beam may be deflected according to the change of the magnetic field. For example, the electron beam may be emitted by the cathode 401 in the z-direction towards the anode 403 initially. The electron beam may be deflected from its initial path due to the magnetic field and/or the electric field imposed or changed by the deflection electrodes 407-1 and 407-2. The focal spot corresponding to the impingement of the electron beam on the anode 403 may change accordingly. For example, if the electron beam moves in its initial path, an initial focal spot 417 may be generated. As another example, when the electron beam is deflected by the magnetic field and/or the electric field imposed by the deflection electrodes 407-1 and 407-2, a focal spot 415 may be generated. The deflection electrodes 407-1 and 407-2 may be located apart from each other along a first direction (e.g., the z-axis as illustrated in FIG. 4) or a second direction (e.g., the x-axis or y-axis as illustrated in FIG. 4) perpendicular to the first direction.

It should be noted that the example illustrated in FIG. 4 is provided for the purposes of illustration, and not intended to limit the scope of the present disclosure. For persons having ordinary skills in the art, various variations and modifications may be conducted under the guidance of the present disclosure. However, those variations and modifications do not depart the scope of the present disclosure. For example, the cathode 401, the anode 403, the housing 405, and deflection electrodes 407-1 and 407-2 may be configured in any shape and arrangement. As another example, the electron beam may move in any direction. As another example, the deflection electrodes 407-1 and 407-2 may be replaced by an electric device that is configured to generate an electric filed, and the electron beam may be deflected by the electric field. Furthermore, the electric field may change over time (e.g., in a periodical manner). The electron beam may be deflected according to the change of the magnetic field.

Figure 6:
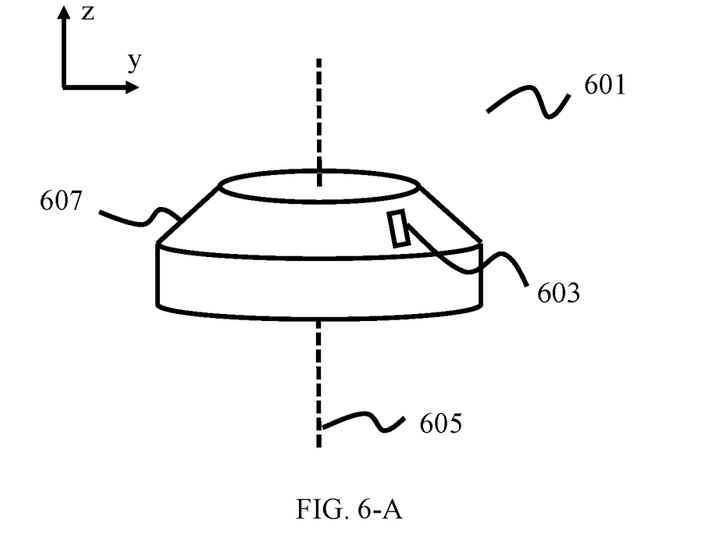

The electron beams are accelerated through the vacuum space between cathode 403 and anode 407 by about 100 kilovolts potential difference, and impact the focal track of the anode. X-rays are produced as electrons strike the focal spot on the focal track, which is mounted on a disk-shaped anode rotated at high speed. The anode comprises a rotatable disk formed of a refractory metal. In some embodiments, an anode 403 may rotate at a high speed to spread the heat generated by the impact of the electron beams. An anode 403 comprises a focal track 607 as shown in FIG. 6. FIG. 6 is a general view of a rotating anode, showing the focal spot. The point at which the X-ray beam impinges on the rotating anode is known as the focal spot 603. The focal spot is located on the slanted side. X-rays are emitted from the focal spot 603 as a result of the rapid deceleration and acceleration of the electrons, leading to the emission of radiation. When the anode begins to rotate, a target track (not shown in FIG. 6) appears.

Cathode 401 generates and emits electrons across vacuum in the form of an electron beam, which is directed at a focal track 411 on anode 403 creating a focal spot. To avoid overheating the anode 403 from the electrons, anode 403 is rotated at a high rate of speed about 90-250 Hz. The X-rays 417 are emitted through the radiation emission passage toward a detector array, such as detector 118 of FIG. 1.

Figure 5:
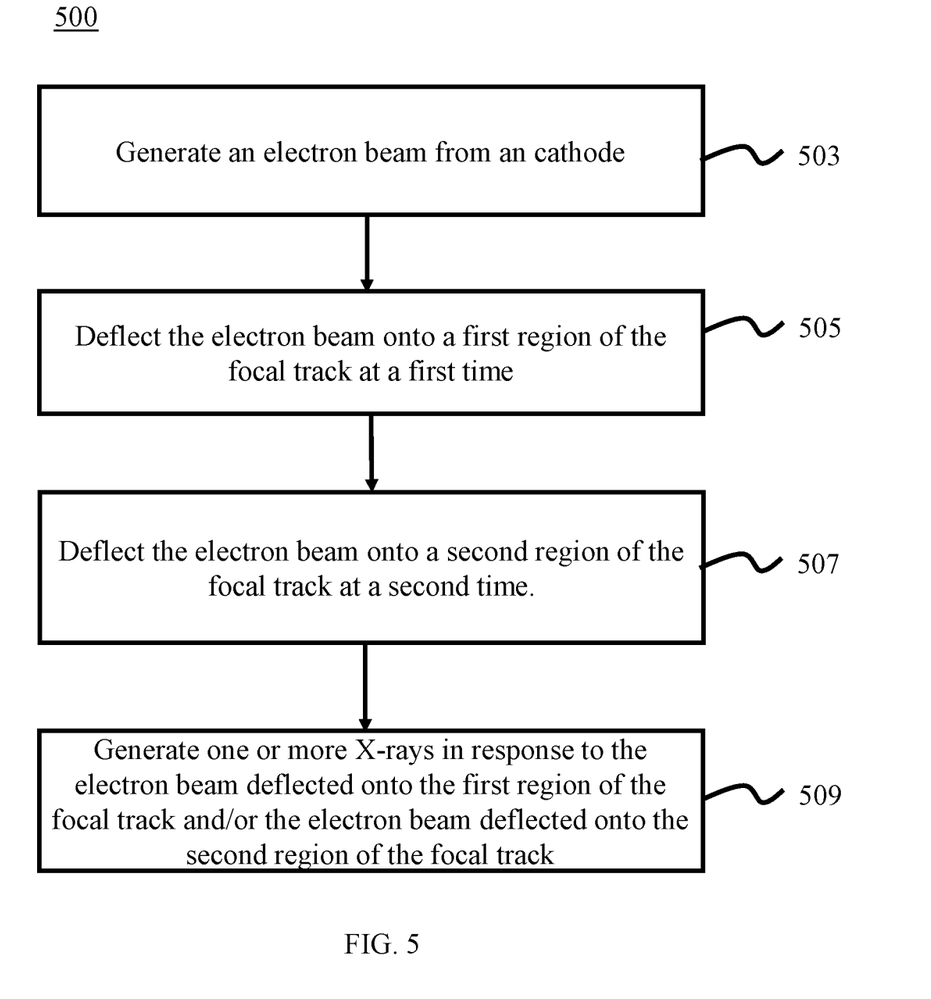
FIG. 5 is a flowchart illustrating a process of generating one or more X-rays in the X-ray imaging system according to some embodiments of the present disclosure.

FIG. 5 is a flowchart illustrating an example of a process 500 of X-ray imaging according to some embodiments of the present disclosure.

In 503, an electron beam is generated from a cathode. The description of the generation of the electron beam may be found elsewhere in the disclosure, e.g., in connection with FIG. 4 and the description thereof.

Figure 9:
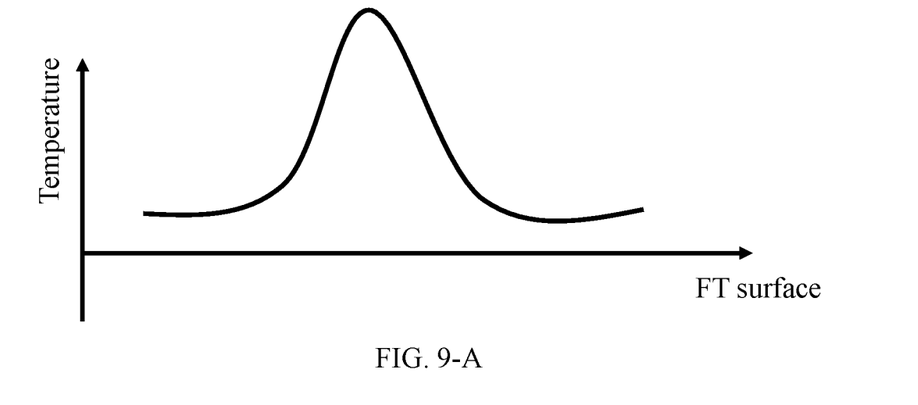

In 505, the electron beam may be deflected on a first focal spot at a first time. The first focal spot may locate at a first portion of the focal track as described elsewhere in the disclosure. When the electron beam impinges on the focal track at the first time, a first target track may be formed on the rotating target by the first focal spot. In some embodiments, the deflection of the electron beam may include impinging the electron beam on the first focal spot directly without changing the path of the electron beam. In some embodiments, the deflection of the electron beam may include deflecting the electron beam by, for example, the deflection device 340, via a first magnetic field. Detailed description regarding the first focal spot may be found in e.g., FIG. 9-A and FIG. 9-B.

In 505, the electron beam may be deflected on a second focal spot at a second time. The second focal spot may locate at a second portion of the focal track as described elsewhere in the disclosure. When the electron beam impinges on the focal track at the second time, a second target track may be formed on the rotating target by the second focal spot. The deflection device 340 can deflect the electron beam. In some embodiments, the second focal spot may at least partially overlap with the first focal spot. For example, as illustrated in FIG. 9-A, the first focal spot FS1 overlaps with the second focal spot FS2. In some embodiments, the second focal spot may be separated from the first focal spot. For example, as illustrated in FIG. 9-B, the first focal spot FS1 separates with the second focal spot FS2. More particularly, for example, the first focal spot FS1 and the second focal spot FS2 are not overlapping. In some embodiments, the positioning of the first focal spot and the second focal spot may be controlled by the deflection device 340. When the deflection device 340 applies different magnetic fields with different magnitudes and/or directions at different times, the path of the electron beam may be changed, and thus the focal spot where the electron beam impinges on the focal track at different times may be changed according to the different magnetic fields.

In 507, one or more X-rays may be generated in response to the electron beam deflected on the first focal spot and/or the electron beam deflected on the second focal spot. The one or more X-rays may be used to scan an object as described elsewhere in the disclosure.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the process 500 may further include deflecting the electron beam on a third focal spot at a third time. The third focal spot may locate at a third portion of the focal track. The third focal spot may be separated from the first focal spot, and/or the second focal spot.

FIGS. 6-A and 6-B are schematics illustrating an exemplary focal spot on a focal track according to some embodiments of the present disclosure. As shown in FIG. 6-A, a focal spot 603 is on a focal track 607. The focal track 607 is on a surface of a rotating target 601. The rotating target 601 may rotate along a rotational axis 605 in the z-direction.

The rotation of the rotating target 601 may cause a target track to be formed on the focal track 607. The target track may be in the shape of a ring. As shown in FIG. 6-B, a side view of a portion of the rotating target 601 is presented. The distance between point a and point d represents the dimension of the focal spot 603 along side 610 in the y-z plane. The side 610 and the y-direction forms an angle θ. In some embodiments, the angle θ may be no more than 10 degrees. Particularly, the angle θ may be in a range from 7 to 10 degrees. Within the range from point a to point d, the distance between point b and point c represents the dimension of the focal spot in the y-z plane that corresponds to the dimension of the focal spot 603 plane in the y-z plane. As described elsewhere in the disclosure, there may be another focal spot represented by point m and point n on the focal track (not shown in FIG. 6-A). Point m and point n may lie within the range of point a and point d. Furthermore, point m and point n may lie within the range of point c and point d when the two focal spot s are separated from each other. The deflection between the two focal spots s (e.g., the distance between point m and point b, point n and point c, or the distance between the center points of the two focal spot s along a certain direction) may be described elsewhere, e.g., FIG. 7 and the description thereof.

Figure 7:
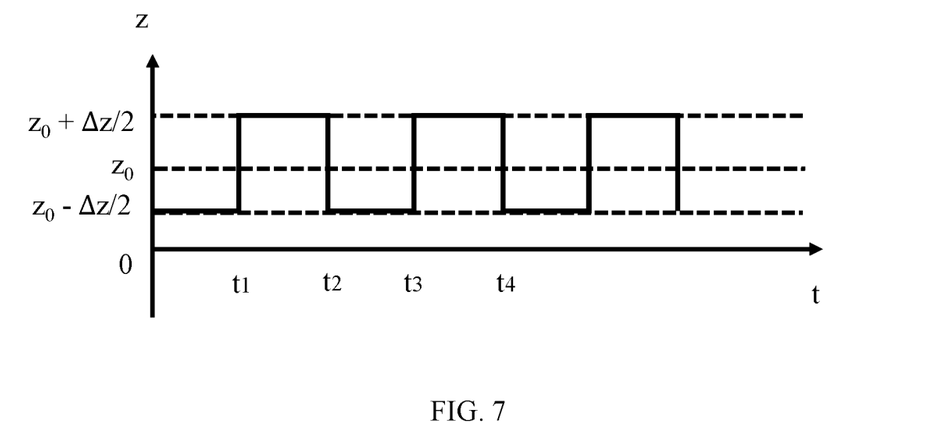
FIG. 7 illustrates a diagram corresponding to deflection between a first focal spot and a second focal spot according to some embodiments of the present disclosure.

FIG. 7 is a diagram illustrating deflection between a first focal spot and a second focal spot according to some embodiments of the present disclosure. As shown, the horizontal coordinates represent the time and the vertical coordinates represent positions along a first direction (referred to herein as "the z-direction"). The position of a focal spot along the z-direction may be represented by a z-coordinate value of the center of the focal spot. As shown, during a first time interval from a first time instant t1 to a second time instant t2, the first focal spot is located at a first position corresponding to a first coordinate (e.g., $z_0+\Delta z/2$). During a second time interval from the second time instant t2 to a third time instant t3, the second focal spot is located at a second position corresponding to a second coordinate (e.g., $z_0-\Delta z/2$). A difference between the first position and the second position (e.g., a difference between the first coordinate and the second coordinate, such as Δz) may relate to a dimension of a detector cell that is configured to detect X-rays. For example, Δz may be equal to 0.5 pitch shift, 1.5 pitch shift, 2.5 pitch shift, or any other half-integer pitch shift. As used herein, one pitch shift may correspond to a side length of the detector cell (e.g., a detector cell of the detector 118 as described in conjunction with FIG. 1).

The value of Δz may relate to the size of the focal spots. The larger the dimension of the focal spot, the larger value of Δz may be needed to separate the first focal spot and the second focal spot. In some embodiments, with a first pitch shift (e.g., 0.5 pitch shift), the first focal spot and the second focal spot may be overlapped. In some embodiments, with a second pitch shift (e.g., 1.5 pitch shift), the first focal spot and the second focal spot may be separated.

In some embodiments, the electron beam is emitting under a first deflection field when the first focal spot is located at the first position corresponding to the first coordinate (e.g., $z_0+\Delta z/2$), while under a second deflection field when the second focal spot is located at the second position corresponding to the second coordinate (e.g., $z_0-\Delta z/2$). The first deflection field and the second deflection field may have different magnitudes and/or directions. Specifically, the electron beam may emit at an original position corresponding to an original coordinate (e.g., $z_0$ when no deflection field is applied). Thus, the first deflection field may deflect the electron beam by a first distance (e.g., $+\Delta z/2$) on the focal track. Similarly, the second deflection field may deflect the electron beam by a second distance (e.g., $-\Delta z/2$) on the focal track. In some embodiments, the electron beam is emitted under no deflection field when the first focal spot is locating at the first position corresponding to the first coordinate (e.g., $z_0+\Delta z/2$), while under a third deflection field when the second focal spot is located at the second position corresponding to the second coordinate (e.g., $z_0-\Delta z/2$). The time interval from the first time instant t1 to the second time instant t2 may be equal to the time interval from the third time instant t3 to a fourth time instant t4.

Figure 8:
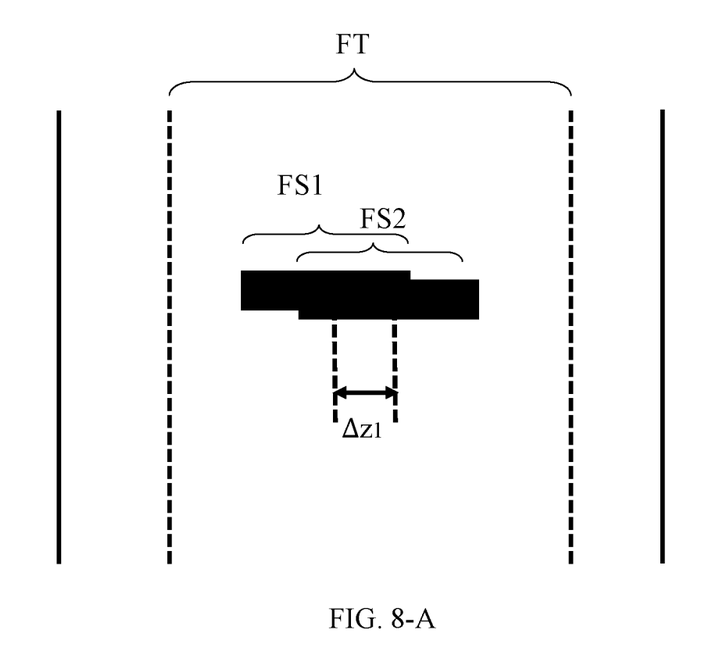

FIGS. 8-A and 8-B illustrate examples of arrangements of focal spots on a focal track according to some embodiments of the present disclosure. As shown in FIG. 8-A, a first focal spot FS1 overlaps with a second focal spot FS2. In some embodiments, the first focal spot FS1 and the second focal spot FS2 may correspond to a first target track and a second target track, respectively. The distance between the first focal spot FS1 and the second focal spot FS2 along the z-direction is Δz1 (also referred as the "first distance"). The first distance may be a first pitch shift (e.g., 0.5 pitch shift or any other suitable value).

As shown in FIG. 8-B, the first focal spot FS1 and second focal spot FS2 may be spaced apart. The distance between the first focal spot FS1 and the second focal spot FS2 along the z-direction is Δz2 (also referred to as the "second distance"). The second distance may be a second pitch shift (e.g., 1.5 pitch shift, 2.5 pitch shift, or any other half-integer pitch shift).

Various arrangements of the focal spots (e.g., overlapping focal spots, non-overlapping focal points) may cause different temperatures on the focal track. FIG. 9-A illustrates a distribution of temperatures of the focal track (FT) according to FIG. 8-A. FIG. 9-B illustrates a distribution of temperatures on the focal track (FT) according to FIG. 8-B. As shown in FIG. 9-A, the overlap of the first focal spot and the second focal spot may cause a temperature rise in the overlap region, compared with other regions on the focal track. In FIG. 9-B, the separation of the first focal spot and the second focal spot may avoid the temperature peak between the first focal spot and the second focal spot. As a result, the separation of the first focal spot and the second focal spot may allow an enhancement of power of, e.g., the electron emitting device 310.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the operator's computer, partly on the operator's computer, as a stand-alone software package, partly on the operator's computer and partly on a remote computer or entirely on the remote computer or server. In the latter scenario, the remote computer may be connected to the operator's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:
1. An imaging device, comprising:
a cathode configured to generate an electron beam;
an anode including a rotating target, the rotating target having a focal track and configured to rotate around an axis along a direction, the anode configured to generate

X-rays in response to the electron beam impinging on the focal track of the rotating target; and a deflection device configured to:

deflect the electron beam onto a first region of the focal track at a first time; and deflect the electron beam onto a second region of the focal track at a second time, wherein the first region of the focal track is separated from the second region of the focal track, and a distance between the first region of the focal track and the second region of the focal track along the direction is a half integer multiple of a dimension of a detector cell that is configured to detect the X-rays.

2. The imaging device of claim 1, wherein the cathode comprises a tungsten filament configured to produce the electron beam.

3. The imaging device of claim 1, wherein the focal track is composed of tungsten-rhenium.

4. The imaging device of claim 1, further comprising a vacuum enclosure between the anode and the cathode, and in the vacuum enclosure there is a potential voltage to accelerate the electron beam.

5. The imaging device of claim 1, wherein the deflection device provides a magnetic field or an electric field configured to deflect the electron beam.

6. The imaging device of claim 5, wherein the magnetic field is generated by a quadrupole or a dipole.

7. The imaging device of claim 1, further comprising a cooling device configured to absorb heat generated by the anode.

8. A method, comprising:

emitting an electron beam from a cathode to a focal track of a rotating target, the rotating target configured to rotate around an axis along a direction;

deflecting the electron beam onto a first region of the focal track at a first time;

deflecting the electron beam onto a second region of the focal track at a second time, wherein the first region of the focal track is separated from the second region of the focal track; and generating X-rays in response to the electron beam deflected onto the first region of the focal track or onto the second region of the focal track, wherein a distance between the first region of the focal track and the second region of the focal track along the direction is a half integer multiple of a dimension of a detector cell that is configured to detect the X-rays.

9. The method of claim 8, wherein the deflecting the electron beam onto the first region or the second region of the focal track is realized by applying one or more magnetic field between the cathode and the rotating target.

10. The method of claim 9, further comprising:

generating a dipole field between the cathode and the rotating target; and deflecting the electron beam onto the first region or the second region of the focal track by changing the dipole field.

11. An imaging system, comprising:

a gantry having a scanning hole extending along a direction;

an X-ray tube located on the gantry, the X-ray tube including:

a cathode configured to generate an electron beam;

an anode including a rotating target, the rotating target having a focal track and configured to rotate around an axis along the direction, the anode configured to generate X-rays in response to the electron beam impinging on the focal track of the rotating target; and a deflection device configured to deflect the electron beam onto one or more regions of the focal track along the direction, wherein the first region of the focal track is separated from the second region of the focal track, and a distance between two of the one or more regions of the focal track along the direction is a half integer multiple of a dimension of a detector cell that is configured to detect the X-rays.

12. The imaging system of claim 11, wherein the one or more regions includes a first region and a second region of the focal track, wherein the electron beam is deflected onto the first region at a first time, and deflected onto the second region at a second time.

13. The imaging system of claim 11, wherein the direction is along a rotational axis of the rotating target.

14. The imaging system of claim 11, wherein the deflection device includes deflection electrodes or an electric device that includes two parts located apart from each other along a second direction perpendicular to the direction, and at least a portion of the X-ray tube passes through a channel between the two parts.

* * * * *